United States Patent [19]
Fleischer

[11] Patent Number: 5,512,391
[45] Date of Patent: * Apr. 30, 1996

[54] SOLID STATE ELECTROCHEMICAL CELL CONTAINING A PROTON-DONATING AROMATIC COMPOUND

[75] Inventor: Niles A. Fleischer, Rehovot, Israel

[73] Assignee: E.C.R. - Electro-Chemical Research Ltd., Yavne, Israel

[*] Notice: The portion of the term of this patent subsequent to Jan. 17, 2012, has been disclaimed.

[21] Appl. No.: 208,326

[22] Filed: May 2, 1994

Related U.S. Application Data

[63] Continuation-in-part of Ser. No. 128,497, Sep. 17, 1993, Pat. No. 5,382,481.

[51] Int. Cl.$^6$ ................................................. H01M 10/40
[52] U.S. Cl. ............................................ 429/213; 429/192
[58] Field of Search ...................................... 429/213, 192

[56] References Cited

U.S. PATENT DOCUMENTS

| | | | |
|---|---|---|---|
| 4,366,216 | 12/1982 | McGinness | 429/213 |
| 4,380,575 | 4/1983 | Nakamura et al. | 429/13 |
| 4,594,297 | 6/1986 | Polak et al. | 429/13 |
| 4,847,174 | 7/1989 | Palmer et al. | 429/112 |
| 5,188,768 | 2/1993 | Sotomura | 429/213 X |

*Primary Examiner*—Stephen Kalafut
*Attorney, Agent, or Firm*—Mark M. Friedman

[57] ABSTRACT

An all solid state battery power source which operates efficiently at room temperature. The battery includes (1) a solid state protonic conductor electrolyte, (2) an anode active material based on an aromatic organic compound capable of producing protons and electrons in an anodic reaction during battery discharge, and (3) a solid cathode capable of reacting with protons. Anode and cathode active materials can be chosen so that the battery has the feature that the electrochemical reactions at the anode and cathode are at least partially reversible. It is suitable for electronic consumer products, biomedical applications, electric vehicle applications, and the like. The battery can be fabricated in any desired shape without any special production precautions.

29 Claims, 1 Drawing Sheet

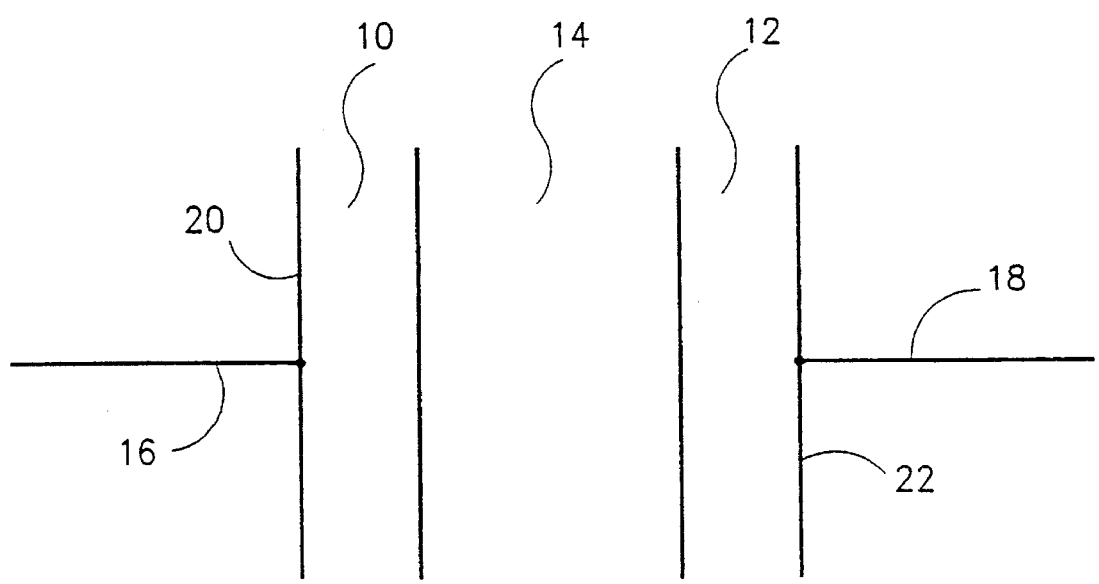
FIGURE

SOLID STATE ELECTROCHEMICAL CELL CONTAINING A PROTON-DONATING AROMATIC COMPOUND

This is a continuation-in-part of U.S. patent application Ser. No. 08/128,497, filed Sep. 7, 1993 now U.S. Pat. No. 5,382,481.

FIELD AND BACKGROUND OF THE INVENTION

This invention relates to electrochemical cells which are used as battery power sources by converting chemical energy to electrical energy. More particularly, this invention relates to batteries which accomplish the conversion of chemical energy to electrical energy by using a solid state protonic conductor electrolyte.

Rechargeable batteries have been developed which contain a solid rather than liquid electrolyte, since these exhibit practical advantages such as avoidance of fluid leakage or drying out. However, such batteries generally employ electrodes composed of metals, such as palladium (see for example U.S. Pat. No. 4,894,301), which are expensive or metal alloys which may be dangerous to health and difficult to manufacture.

SUMMARY OF THE INVENTION

The invention serves to provide a battery containing a solid proton conductor electrolyte, in which there is employed an anode free of metal and metal alloys and which contains a proton-donating aromatic compound, thus achieving the advantages of solid electrolytes and avoiding the disadvantages of metal-containing anodes.

Thus, in accordance with the invention, there is provided a battery comprising an anode, a cathode and a solid state proton-conducting electrolyte between, and in contact with, the anode and cathode, wherein:

(a) the anode includes a material composed of a proton-donating aromatic compound;

(b) the cathode includes a proton-accepting compound; and (c) the electrolyte is a solid state proton-conducting material.

In an electrochemically rechargeable version of an electrochemical cell according to the present invention the anode and cathode active materials are specifically chosen so that the solid cathode active component reacts at least partially reversibly with the hydrogen ions and the solid anode active component is capable of providing hydrogen ions in an electrochemical reaction to produce electrical energy during battery discharge and to accept at least a partial amount of hydrogen ions during battery charging of those which were produced during discharge.

While electrochemical reactions involving the reversible dissociation of hydroquinone into quinone, protons and electrons and methylene blue oxidized to yield a proton and an electron are known, these reactions have been carried out using the hydroquinone or methylene blue as dissolved substances in a liquid electrolyte. The application of hydroquinone and other similar hydroxy-containing aromatic groups and methylene blue and other similar proton-donating aromatic compounds in electrochemical reactions using a solid electrolyte as the proton-conducting medium, and especially as anodes in solid state battery applications, are not known in the prior art.

In conventional batteries based on proton reactions, such as nickel/metal hydride cells, hydrogen is stored as a hydride in a hydrogen storage alloy or hydrogen storage metal and converted to protons in an electrochemical reaction. The protons are transferred to the cathode in a liquid electrolyte.

Many of the aromatic hydrogen redox materials are known as redox couples which are dissolved in aqueous or non-aqueous electrolytes. In the present invention, a distinguishing feature is that they are used as a hydrogen ion source in the solid state and the protons are transported in a solid state proton conductor electrolyte.

The aromatic hydrogen ion source materials of the present invention are distinct from previously known hydrogen storage compounds such as $PdH_x$ (U.S. Pat. No. 4,894,301) and metal alloy hydrides such as $LaNi_{4.7}Al_{0.3}$ (J. Electrochem. Soc., vol. 134, 1987, p. 558, T. Sakai, et al.), or $MnNi_{3.5}Co_{0.7}Al_{0.8}$ (Mm=mischmetal, composition on atomic percent: La - 25.4, Ce - 53.6, Pr - 5.4, Nd - 15.6, J. Electrochem. Soc., vol. 139, 1992, p. 172, N. Kuriyama, et al.). Similar effective compositions are also known such as $MmNi_{3.6}Co_{0.7}Al_{0.3}$ and alloys containing V, Ni, Ti, Zr and Co in various stoichiometries (U.S. Pat. No. 5,135,589). The prior art electrodes have the disadvantages of using expensive metals such as Pd, or dangerous metals to heath like Ni and Co, or rare earth metals. Another disadvantage is the complicated metallurgy and manufacturing expense required to arrive at the proper composition of the metal alloy hydrogen storage electrodes. In addition, the prior art hydride electrodes are used in batteries which use a liquid electrolyte, typically aqueous KOH solutions.

Some other of the disadvantages (see, for instance, A. Visintin, in Electrochem. Soc., vol. 139, 1992, p. 985) of the current metal/hydride batteries are their high self-discharge rate and low volumetric energy density. In addition, since they have within partial pressures of hydrogen gas, they could pose a safety hazard. Also, cell assembly is complicated and made expensive since they may be pressurized and in some cases operate with internal pressures of 30–50 atmospheres.

The present invention possesses advantages over the conventional metal/hydride battery. For instance, since there is no liquid electrolyte in a cell according to the present invention, there is no problem of cell leakage or drying out and no separators between the electrodes are required. Also, the cell operates at atmospheric pressure so cell design and assembly is less expensive, simpler and safer. Also, since the cell contains no hydrogen gas, the cell is inherently safer.

Other advantages include safer operation, the elimination of expensive hydrogen storage materials and the elimination of the need for loading the metal hydride under hydrogen pressure as in prior art technology.

BRIEF DESCRIPTION OF THE DRAWINGS

The invention is herein described, by way of example only, with reference to the accompanying drawing, wherein the sole FIGURE schematically depicts in cross-sectional view a battery according to the present invention showing an anode 10, a cathode 12 and an electrolyte 14, as well as a pair of leads 16 and 18 and, optionally, a pair of conducting plates 20 and 22.

DESCRIPTION OF THE PREFERRED EMBODIMENTS

The proton-donating anode material employed in accordance with the invention is an aromatic compound. The theoretical capacity of the anodic aromatic material will depend on its molecular weight and the number of active hydrogen ion sites. An active hydrogen ion site in this invention is represented, for example, by a hydroxy group (except for methylene blue). Depending on the end-use applications, the choice of anode and cathode active materials, and the type of electronic conductive electrode additives, can be chosen to best meet the requirements of the particular application of the invention.

Beside methylene blue, the various possible compounds are cyclic aromatic hydrocarbons with attached hydroxy groups which may, in addition, feature additional functional groups. Furthermore, one or more carbons in the rings may be substituted with other constituents, such as nitrogen or oxygen.

Certain of the compounds feature a benzene ring. For example, mono-hydroxy derivatives such as hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid and methylparabin; di-hydroxy derivatives, such as 1,4-dihydroxy benzene (hydroquinone), 3-hydroxy tyramine (dopamine), and co-enzyme where n, the length of the isoprenoid chain attached to the benzoid ring, is in the range of from 1 to 10; tri-hydroxy derivatives such as 1,2,3-trihydroxy benzene (pyrogallol) and 1,3,5-trihydroxy benzene (phloroglucinol); tetra-hydroxy benzene derivatives such as tetrahydroxy quinone (THQ, also known as tetroquinone or tetrahydroxy-p-quinone) in its non-hydrated, dihydrate and hydrated forms, with the dihydrate being preferred.

Other of the compounds are condensed or fused polycyclic aromatic in which adjacent rings share two carbons. For example, bi-cyclic naphthalene derivatives such as mono-hydroxy derivatives like naphthols and hydroxy-1,4-naphthoquinone, di-hydroxy derivatives such as naphthalene diols and penta-hydroxy naphthoquinones such as echinochrome. Other examples are tri-cyclic anthracene derivatives such as mono-hydroxy derivatives like anthranol and hydroxy anthraquinone, di-hydroxy derivatives like anthralin, anthrarufin, alizarin and di-hydroxyanthraquinone, tri-hydroxy derivatives like anthrobin, anthragallol, purpurin and 1,8,9-anthracenetriol, and tetra-hydroxy derivatives like 1,2,5,8-tetrahydroxyanthraquinone and carminic acid. Still other examples are bi-cyclic derivatives such as purpogallin.

Further compounds are biaryls, benzoid compounds in which benzene rings or condensed systems are attached by a bond, such as hydroxybenzophenone, hydroquinone monobenzylether, hydroxy biphenyl, methylenedigallic acid and methylenedisalicyclic acid, or compounds having an oxygen substituting for a carbon in an aromatic ring like 5-hydroxy-2(5H)-furanone, hydroxycourmarin and fustin, or a nitrogen substituted aromatic ring like the multi-cyclic hydroxindole, tetrahydro papaveroline and hydroxyjulolidine and the single-ringed N-hydroxymaleimide, citrazinic acid and hydroxy methyl pyridine.

Yet further compounds include squaric acid, tetrahydroxy acetophenone, tetrahydroxy benzoic acid, Rhodizonic acid, croconic acid, hexahydroxy benzene and reductic acid.

Methylene blue is a known redox material which reacts reversibly with protons in electrochemical redox reactions. The successful use of methylene blue as an anode material (see Example 7 below) teaches that the reversible redox of protons in a solid state battery according to the present invention is not limited to hydroxy-substituted aromatic compounds such as those listed above but is a broader behavior of several types of aromatic proton-donating materials.

It is to be understood that the aforementioned listing of aromatic organic compounds for the solid state anode is only representative of the class of hydrogen ion sources which are contemplated for use as the active aromatic organic material in the anode of the present invention. Any solid substances capable of acting as a source of protons in an electrochemical reaction at the anode of a battery power source for conversion of chemical energy to electrical energy may be used as the active component for the anode in such a battery.

The cathode may be made from one or more of a number of materials including but not limited to, $WO_3$, transition metal dioxides $MO_2$ (where M=Mn, Mo, Ir, Cr, Ti, Nb, V, or W), $V_2O_3$ and related vanadium oxides, NiOOH, $(CF)_x$, $(C_2F)_x$ and naphthalene. Preferably the cathode includes manganese dioxide, which may be various grades of electrolytic or chemical manganese dioxide, with the untreated electrolytic form being preferred, or may be heat treated electrolytic and chemical manganese dioxide which is heated at about 375° C. for about eight hours in air and is then oven cooled.

The cathode materials are not specifically defined and are available in different grades with various levels of activity, purity, chemical and physical characteristics, and prepared by a variety of methods.

It is a property of the solid state protonic conductor electrolyte used in the present invention to pass hydrogen ions and to have high protonic conductivity especially at room and ambient temperature. The electrolyte should also be at least partially stable towards the components of the anode, cathode and current collector.

It is known from the prior art that rechargeable batteries have been developed which contain a solid proton-conducting electrolyte rather than a liquid electrolyte. Such solid state batteries exhibit practical advantages such as avoidance of fluid leakage or drying out, no need for a separator between the electrodes, and lend themselves to be constructed into various shapes and flexible designs with simpler manufacturing technologies possible as compared to liquid electrolyte cells. Furthermore, solid state electrolyte batteries are generally considered to have good shelf life and storage stability.

The solid electrolyte of the present invention is a solid state proton conductor, such as a heteropoly acid, for example, molybdophosphoric acid (MPA) or tungstophosphoric acid (TPA) or salts thereof or their respective hydrates at various states of hydration or mixtures of these. Other examples of suitable heteropoly acids are referred to in U.S. Pat. Nos. 4,024,036 and 4,594,297 which are incorporated by reference as if fully set forth herein. Some properties of MPA and TPA are described in Chemistry Letters, pp. 17–18, 1979, O. Nakamura, et al.

It is to be understood that the aforementioned listing of solid state protonic conductors are only representative of the class of solid protonic conductors which are contemplated to be employed as the solid state proton-conducting electrolyte in the present invention. In addition, besides incorporating the solid electrolyte in raw form in the battery, it can be processed into gel form by using various gelling agents such as silica gels (see, Solid State Ionics 59 (1993) p. 171, M. Tatasumisago, et al.), or used in a polymer blend as in U.S. Pat. No. 4,594,297, or processed according to the methods given in the Examples below.

It is known from the prior art that a number of solid state proton conductors exist and some have been used in batter/applications. MPA and TPA are among the highest conductivity solid state protonic conductors at room temperature. It is important to note that the prior art teachings of heteropoly acids refers only to their use in fuel cells. There is no prior art for their application in battery power sources.

In a preferred embodiment of the invention, the anode and the cathode each further contains a non-metallic electrically conductive material, for example graphite or carbon black, and a solid state proton-conducting material such as a heteropoly acid, for example molybdophosphoric acid. Preferably, the proton-conducting material present in the anode and cathode is the same as that comprising the solid electrolyte.

The solid state rechargeable batteries of the invention can easily be fabricated at ambient temperatures without any special precautions with regard to low humidity or oxygen-free atmospheres. They can be made by, for example, pressing or printing in thin layers as by silk screening or computer designed printing. The battery may be made in any desired size and shape and several cells may be fabricated in series, in which case adjacent cells can be separated by a non-metallic end plate, preferably a graphite or carbon black end plate, since this will not be attacked by the solid MPA electrolyte.

When, after use, the battery has become discharged, recharging of the battery can be effected by applying an appropriate voltage or current across the cell.

The following non-limitative Examples illustrate the invention.

EXAMPLE 1

An anode mix was prepared by first mixing and grinding together at room temperature 0.5 g of graphite powder and 2.0 g of hydroquinone until a homogeneous mixture was obtained (A-1). To 0.105 g of A-1 were then added 150 mg of molybdophosphoric acid (MPA) powder to give a mixture (A-1-M) consisting by weight of 33% hydroquinone, 59% MPA and 8% graphite.

A cathode mix was prepared by first mixing and grinding together at room temperature 277 mg of graphite and 2.464 g of $MnO_2$ until a homogeneous mixture was obtained (C-1). To 0.106 g of C-1 were then added 148 mg of 38% $MnO_2$, 58% MPA and 4% graphite.

A battery cell was constructed by pressing in a cylindrical pellet die of 13 mm diameter made from an electrically insulating sleeve of polymethylmethacrylate plastics material and 316 stainless steel pellets. The insulating sleeve was necessary to prevent shorting out during pressing.

A first stainless steel pellet was loaded into the sleeve and a first 0.2 mm thick graphite sheet was then placed into the die to avoid contact between the MPA and the steel pellet and to provide a good surface for electrical contact to the external circuit. 0.124 g of A-1-M powder was then placed in the die on top of the graphite sheet. A second steel pellet was placed on top of the anode mix, which was then lightly pressed by hand. The second steel pellet was then removed and 0.277 g of MPA was added to completely cover the lightly pressed anode mix. The MPA was lightly pressed on to the anode mix using the steel pellet which was again removed and 0.124 g of cathode mix C-1-M was added to completely cover the lightly pressed MPA electrolyte layer. A second graphite sheet identical to the first sheet was then placed in the die on top of the C-1-M mix and the second steel pellet was placed on top of the graphite sheet and the entire cell heavily pressed in a vice. The resulting composite pellet consisted of five distinct layers: graphite sheet, A-1-M, MPA, C-1-M, and graphite sheet. This composite pellet was easily and cleanly removed from the press die as a single unit and was ready for use.

The battery cell made in the foregoing manner had an open circuit potential of +0.584 volts (close to the theoretical voltage for the hydroquinone/quinone: $MnO_2$ couple in acid electrolyte of +0.551 volts). This is a good indication that the following reactions occur in the cell:

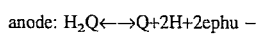

anode: $H_2Q \leftarrow\rightarrow Q + 2H + 2ephu -$

cathode: $MnO_2 + H^+ + e^- \leftarrow\rightarrow MnOOH$ where $H_2Q$ represents hydroquinone and Q represents quinone. The battery cell was then discharged for 17 hours on a resistive load of 8 kiloohms. The working voltage remained above +0.4 volts during this time. The cell was then charged by 1.550 volts dropped across a 100 kiloohm resistor for 8 hours. At the end of charging the voltage was about +0.726 volts. The cell was then discharged in the same resistive load for 15 hours and then recharged for six days to a voltage of +1.018 volts, following which it was again discharged for a third time on the same resistive load.

EXAMPLE 2

A three cell bipolar battery was constructed using the same procedure as in Example 1. The anode mix (A-2-M) consisted of 350 mg A-1 mixed with 150 mg of MPA. Thus, the A-2-M mix contained by weight 56% HQ, 14% graphite and 30% MPA.

The cathode mix (C-2-M) consisted of 350 mg of C-1 mixed with 150 mg of MPA. Thus the C-2-N mix consisted by weight of 63% MnO2, 7% graphite and 30% MPA. The order of the construction was the same as in Example 1. After the graphite sheet had been placed on top of the C-2-M mix, the order was repeated twice more in order to build a three cell battery in the plastic die. The graphite sheets between the cells acted as a bipolar current collector.

The open circuit voltage of the battery was +1.66 volts, or +0.553 volts per cell. This battery was discharged and charged as in Example 1.

EXAMPLE 3

This Example illustrates how the cell components can be screen-printed instead of being formed as pressed powders. A mixture was formed from 6 g of white plastic glue, 2 g of deionized water, 0.4 g of carbon powder and 3.5 g of $MnO_2$ powder until homogeneous. This mixture was then spread on a polyester sheet as a thin layer and allowed to dry in air at room temperature for about half an hour. The resulting electrode was peeled off the polyester sheet and was found to have a resistivity of 5–12 ohms per square centimeter across its thickness of about 0.1 mm.

In place of the white plastic glue, other glues and epoxy resins can be used. Graphite, or other types of conductive additives, can be used instead of, or in addition to, the carbon.

EXAMPLE 4

Electrodes were prepared as in Example 3 using 7 g of white plastic glue, 3 g of deionized water, 1 g of $MnO_2$ and 0.8 g of carbon. The resulting electrode had a thickness resistivity of 1–2 ohms per square centimeter across its thickness of about 0.1 mm.

EXAMPLE 5

Using the procedure described in Example 1, two cells were constructed using a cathode mix consisting by weight of 36% WO$_3$, 6% graphite and 58% solid MPA. The remainder of the cell was as in Example 1. The open circuit voltages of the two cells were 0.098 and 0.120 volts, respectively. The cells showed only slight polarization on a 150 ohm load indicating that the system had good rate capability. This Example particularly shows that the hydroquinone anode mix is a high rate electrode and that the MPA is capable of supporting large currents. The reaction at the cathode in this Example was:

$$WO_3 + xH^+ + xe^- \leftrightarrow H_xWO_3$$

EXAMPLE 6

The procedure of Example 1 was repeated substituting carbon black for the graphite in the cathode mix. This provided a cell with a flatter discharge voltage profile than in comparable cells using graphite as the conductive additive in the cathode mix. The same weight per cent in the composition of MnO$_2$ and MPA electrolyte was used as in Example 1 giving: 38% MnO$_2$, 4% carbon black and 58% MPA. The remainder of the cell had an open circuit voltage of 0.533 volts. During discharge on the same drain as in Example 1, the voltage curve profile was flatter than cells containing graphite in the cathode mix. A flatter profile has the desirable properties of lower cell polarization, greater energy density and higher average voltage. When discharge had been terminated, the cell was recharged using the same conditions as in Example 1.

EXAMPLE 7

A cell was produced substituting the hydroquinone in the anode mix by methylene blue (MB). The composition of the anode mix in weight per cent was: 28% MB, 14% graphite and 58% MPA. The remainder of the cell was as described in Example 1. The open circuit voltage of the cell was 0.483 volts. The cell was discharged and charged using the conditions of Example 1.

EXAMPLE 8

A cell was produced using acetaminophen in place of hydroquinone. A mixture consisting of 75 weight per cent acetaminophen and 25% of providone, starch and stearic acid (mixture X). Mixture X was blended with graphite and MPA solid electrolyte in the following weight per cent: X 33%, graphite 8% and MPA 59%. The resulting anode mix was used as the anode in a cell constructed in the manner described in Example 1. The open circuit voltage of this cell was 0.423 volts. The cell was capable of being discharged using the conditions of Example 1.

EXAMPLE 9

In this Example the cell composition was the same as in Example 1, but instead of circular pellets, the powders were compacted in layer form between graphite sheets into an asymmetric shape, which had the advantage that it could be inserted with only one side (that is polarity) into the receiving form. This is useful because it prevents mistakes in the orientation of the polarity of the battery on the device in which the battery is to be used. It is also useful since asymmetric receiving forms can be designed to receive battery power sources. The discharge behavior of this cell was the same as the cell of Example 1. When discharge had terminated, the cell was charged at much higher currents than in Example 1, the charging voltage being 1.521 volts dropped across a 22 kiloohm resistor. The cell was able to accept this fast charge mode and thereafter be usefully discharged.

EXAMPLE 10

In this Example 800 mg of hydroquinone were dissolved in 10 cc of deionized water containing 1.4 g of MPA. The pH of the plain MPA solution was about 1. Upon the addition of the hydroquinone, the solution turned from its yellowish color to dark greenish blue. 8 cc more of deionized water were added to this solution which was then heated on a hot plate at 37° C. with stirring. When nearly all of the water had evaporated, the stirring was terminated and the solution was allowed to dry to completion. The resulting dry material (Y) was dark blue. An anode mix containing in weight per cent: 33% Y, 8% graphite and 59% MPA, was used to construct a cell as in Example 1. This cell had an open circuit voltage of 0.455 volts and was usefully discharged under the conditions described in Example 1.

EXAMPLE 11

A battery cell was constructed as in Example 1, except that in the cathode mix, the MnO$_2$ was replaced by naphthalene. The open circuit voltage of the resulting cell was about 0.185 volts.

EXAMPLE 12

A cell was constructed using the anode, electrolyte and cathode compositions as in Example 1, but the graphite foil end plate, anode mix, electrolyte, cathode mix and graphite foil end plate were pressed sequentially inside a flexible plastic tube to form a bipolar battery. The bipolar current collector was the graphite foil as in Example 2. In this manner, a multi-cell battery was constructed having an open circuit voltage which was the sum of the individual cell voltages. In this way batteries with voltages of greater than 2 volts were prepared. Individual cell voltages were of the order of 0.565 volts. The advantage of using a flexible plastic tube for the battery housing was that the battery was flexible.

EXAMPLE 13

A flexible tube battery was assembled as in Example 12, except that the cathode mix was replaced by the naphthalene cathode mix of Example 11. A bipolar battery was obtained, the open circuit voltage of which was the sum of the individual cells.

EXAMPLE 14

A battery cell was constructed as in Example 1, except that the molybdophosphoric acid (MPA) was replaced by tungstophosphoric acid (TPA) in the anode and cathode mixes and solid electrolyte. The weight per cent composition in the anode and cathode mixes was the same, but the amount of TPA used for the electrolyte was 493 mg. The open circuit voltage of this cell was 0.591. It was discharged using the same conditions as in Example 1 to provide useful energy.

EXAMPLE 15

The procedure described in Example 1 was repeated to prepare cells. The anode mix consisted of the following weight percentages: 33.3% THQ, 8.3% MPA and 58.3% graphite powder. The cathode consisted of 75% electrolytic manganese dioxide, 21% MPA and 4% graphite powder. The typical particle diameter of the graphite powder was about 6 microns. The insulating sleeve of the 12 mm diameter die in this example is anodized aluminum. The anodizing treatment created a highly electrically insulating and smooth layer on the surface of the aluminum die block. Cells were pressed at one ton.

Typical open circuit voltages of cells with the above composition are about _0.790 to +0.780 volts. Such cells were discharged on continuous drains across resistive loads corresponding to current densities in the range from 0.13 to 7 mA per square centimeter with working voltages of about 0.720 to 0.550 volts, respectively. Pulse current densities of 9 mA per square centimeter at voltages greater than +0.400 volts can be achieved with this cell. Repeated discharge-charge cycles were performed with the charging performed by dropping 1.5 volts across a 16 kiloohm resistor in series with the cell.

EXAMPLE 16

An eight cell bipolar battery was constructed with cells built according to those in Example 15. In this case, cell shape was rectangular. Graphite sheets between the cells acted as a bipolar connector.

EXAMPLE 17

It is known from the prior art that the conductivity of the MPA electrolyte is dependent on the amount of hydrated water molecules contained in its crystal structure. At typical room conditions some of this water may be lost from the MPA. In order to prevent this, cells built in accordance with Example 15 were sealed around their periphery to prevent possible water loss. Sealing the periphery of cells can be accomplished either by water impermeable film barriers such as by the commercial product which is sold under the trade name "Parafilm" or appropriate glues, lacquers, or polymer solutions which, when dried or polymerized, act to prevent water loss. In this way, water loss was essentially eliminated from the MPA electrolyte constructed into the cells.

EXAMPLE 18

Further to Example 17, a proton conducting water impermeable barrier or sealant can be introduced into the heteropolyacid electrolyte directly. In one version, a Nation solution is mixed with the solid electrolyte powder mix and then the Nation is allowed to set up. The Nation acts as a water barrier around the powder grains to prevent water loss. In other versions, other sealants can be dry-mixed with the electrolyte powder to coat the powder grains. In yet other variations, the Nation was applied to the external faces of pressed pellets of the electrolyte to prevent water loss.

EXAMPLE 19

Cells can be made according to the various methods described in Examples 15–18, such as, but not limited to, those described in Examples 1–14. In order to build battery packs consisting of a number of cells it is desirable to fill all the available volume within the pack with cells without any unused space. In order to do this, since some packs have unusual shapes, the size and shape of the cells need to conform to the internal dimensions of the pack. In order to do this, cells can be cut into the desired shapes. The cutting needs to be performed without short circuiting the cells. For instance, a blade which is not electrically conductive can be used, laser or other types of energy beams, or other methods. This eliminates the need for a range of dies for each individual shape cell and facilitates mass production of various shaped batteries.

EXAMPLE 20

Some of the organic compounds described herein for anode active materials might move towards the cathode thorough the electrolyte and cause some degree of self-discharge. In order to prevent this, the active materials can be set in polymers or polymerized to prevent their movement through the electrolyte. Separator barriers such as, but not limited to, those based on cellophane can also be inserted into the electrolyte to prevent migration.

EXAMPLE 21

In order to catalyze the protonic reaction at the anode during discharge and charge of the cell, various catalysts can be added to the anode mix. For instance, a 10% palladium hydrogenation catalyst on activated carbon can be added to the anode mix. For one skilled in the art, it is apparent that other catalysts can also be chosen.

EXAMPLE 22

Further to Example 17, hygroscopic materials can be mixed with the acid electrolyte in order to minimize loss of hydrated water from the heteropolyacid. In this way, the hydrated water of the heteropolyacid is maintained. In one version, a hygroscopic salt such as calcium chloride was mixed with the heteropolyacid. One skilled in the art would be able to envision many other hygroscopic materials which one can use for this purpose.

While the invention has been described with respect to a limited number of embodiments, it will be appreciated that many variations, modifications and other applications of the invention may be made.

What is claimed is:

1. A battery comprising an anode, a cathode and a solid state electrolyte between, and in contact with, the anode and cathode, wherein:

(a) the anode includes a material composed of a proton-donating aromatic compound;

(b) the cathode includes a proton-accepting compound; and (c) the electrolyte is a solid state proton-conducting material.

2. A battery as in claim 1, wherein the anode is selected from the group consisting of hydroquinone, phloroglucinol, echinochrome, 1,2,5,8-tetrahydroxyanthraquinone, purpogallin, methylenedigallic acid, methylene blue, hydroxy acetophenone, acetaminophen, hydroxybenzyl alcohol, dopamine, pyrogallol, naphthols, anthranol, anthrarufin, anthrobin, purpurin, tetrahydroxybenzophenone, co-enzyme $Q_n$, where n, the length of the isoprenoid chain attached to the benzoid ring, is in the range of from 1 to 10, hydroquinone monomethyl ether, citrazinic acid, hydroxybenzophenone, hydroxy biphenyl, tetrahydro papaveroline, fustin, hydroquinone monobenzylether hydroxymethyl pyridine, squaric acid, tetrahydroxy acetophenone, tetrahydroxy benzoic acid, Rhodizonic acid, croconic acid, hexahydroxy benzene, reductic acid and tetrahydroxy quinone.

3. A battery as in claim 1, wherein the anode is selected from the group consisting of hydroquinone, phloroglucinol, echinochrome, 1,2,5,8-tetrahydroxyanthraquinone, purpogallin, methylenedigallic acid, methylene blue, hydroxy acetophenone, acetaminophen, hydroxybenzyl alcohol, dopamine, pyrogallol, naphthols, anthranol, anthrarufin, anthrobin, purpurin, tetrahydroxybenzophenone, tetrahydroxy quinone, and co-enzyme $Q_n$, where n, the length of the isoprenoid chain attached to the benzoid ring, is in the range of from 1 to 10.

4. A battery as in claim 1, wherein the anode is selected from the group consisting of hydroquinone, phloroglucinol, echinochrome, 1,2,5,8-tetrahydroxyanthraquinone, purpogallin, methylenedigallic acid, methylene blue and tetrahydroxy quinone.

5. A battery as in claim 1, wherein the anode is selected from the group consisting of hydroquinone, tetrahydroxy quinone, methylene blue and acetaminophen.

6. A battery as in claim 1, wherein the anode includes tetrahydroxy quinone.

7. A battery as in claim 6, wherein said tetrahydroxy quinone is in a form selected from non-hydrated, dihydrate and hydrated types.

8. A battery as in claim 7, wherein said tetrahydroxy quinone is in the dihydrate form.

9. A battery as in claim 1, wherein the cathode includes a compound selected from the groups consisting of metal oxides, $(CF)_x$, $(C_2F)_x$, NiOOH and naphthalenes as the proton-accepting compound.

10. A battery as in claim 1, wherein the cathode includes $(CF)_x$.

11. A battery as in claim 1, wherein the cathode includes a transition metal dioxide.

12. A battery as in claim 11, wherein said transition metal dioxide is manganese dioxide.

13. A battery as in claim 12 wherein said manganese dioxide is in a form selected from electrolytic and chemical.

14. A battery as in claim 13, wherein said manganese is heat treated.

15. A battery as in claim 13, wherein said manganese is electrolytic.

16. A battery as in claim 1, wherein the anode further contains a non-metallic electrically conductive material.

17. A battery as in claim 1, wherein the anode further contains a proton-conducting material.

18. A battery as in claim 1, wherein the cathode further contains a non-metallic electrically conductive material.

19. A battery as in claim 1, wherein the cathode further contains a proton-conducting material.

20. A battery as in claim 16 wherein said non-metallic electrically conductive material is selected from the group consisting of graphite and carbon black.

21. A battery as in claim 18 wherein said non-metallic electrically conductive material is selected from the group consisting of graphite and carbon black.

22. A battery as in claim 1, wherein said proton-conducting material includes a heteropolyacid.

23. A battery as in claim 22, wherein said heteropolyacid is selected from the group consisting of molybdophosphoric acid and tungstophosphoric acid.

24. A battery as in claim 1, wherein the cathode includes manganese dioxide, carbon and molybdophosphoric acid, wherein the anode includes tetrahydroxyquinone, carbon and molybdophosphoric acid, and wherein the electrolyte includes molybdophosphoric acid.

25. A battery as in claim 1, wherein said electrolyte includes a heteropolyacid and another proton conductor.

26. A battery as in claim 1, wherein said anode in polymerized form.

27. A battery as in claim 1, wherein said cathode in polymerized form.

28. A battery as in claim 1, wherein said anode includes a catalyst for anodic battery reactions.

29. A battery as in claim 1, wherein said electrolyte includes a heteropolyacid and a hygroscopic material.

\* \* \* \* \*